G. DODGE, 2 Sheets—Sheet 1.
Assignor of one-half interest to E. ALLEN.
Plow.
No. 8,926. Reissued Oct. 14, 1879.
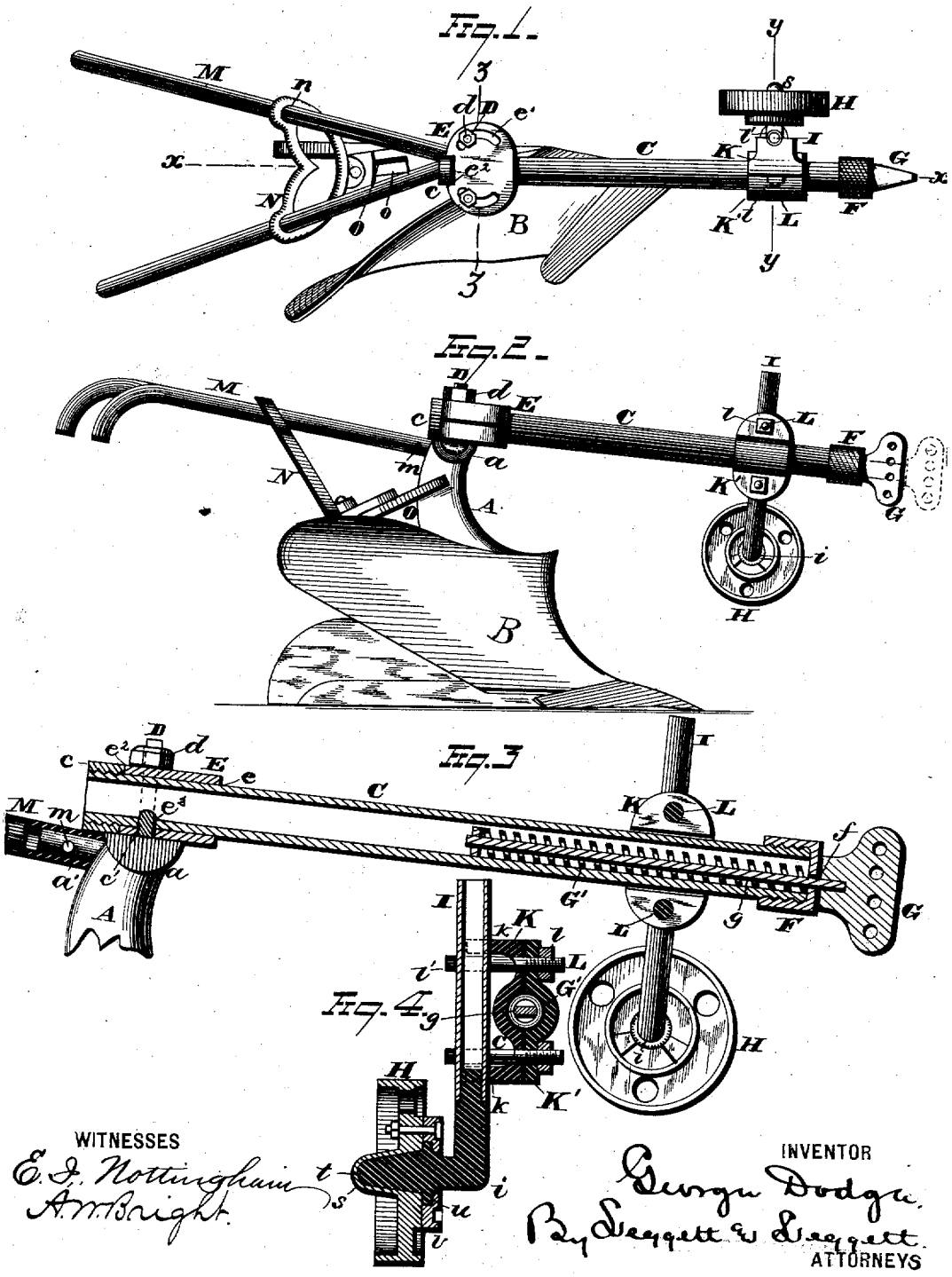
WITNESSES
E. J. Nottingham
A. M. Bright
INVENTOR
George Dodge.
By Baggett & Baggett.
ATTORNEYS
N. PETERS, PHOTO-LITHOGRAPHER, WASHINGTON, D. C.

G DODGE,
Assignor of one-half interest to E. ALLEN.
Plow.
No. 8,926. Reissued Oct. 14, 1879.
Fig. 5.
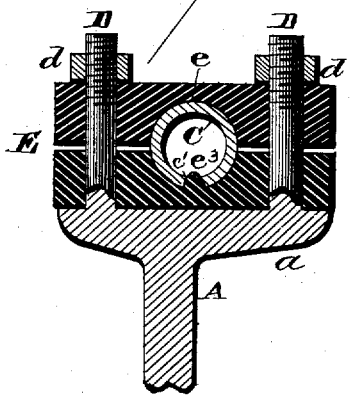
Fig. 6.
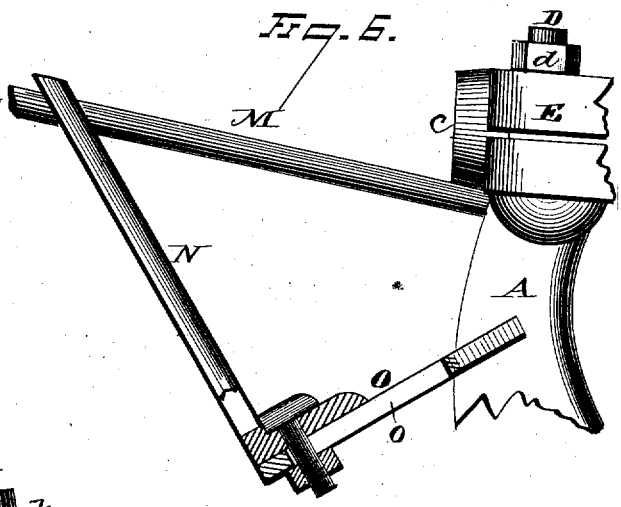
Fig. 7.
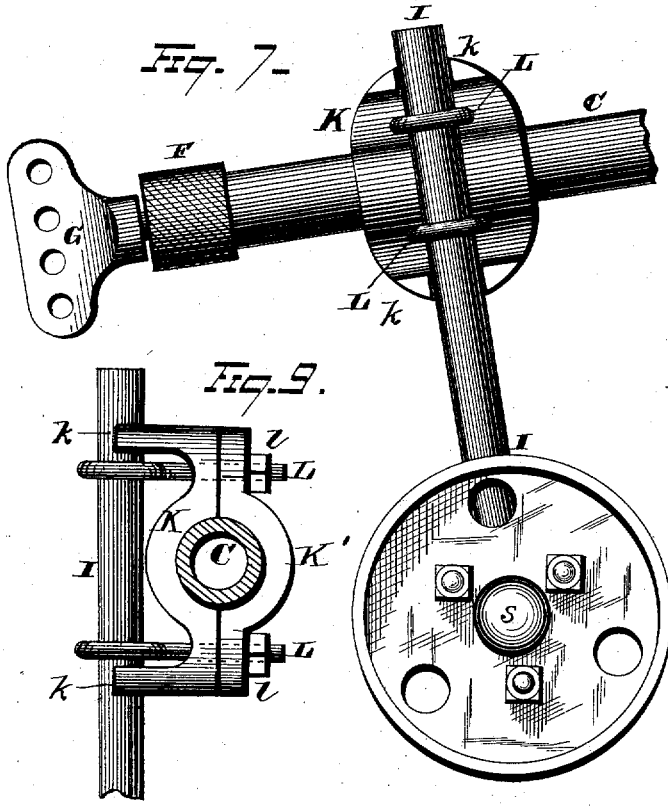
Fig. 8.
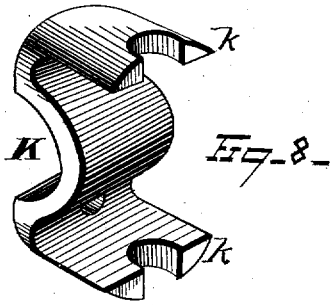
Fig. 9.
WITNESSES
E. F. Nottingham
A. M. Bright.
INVENTOR
George Dodge.
By Seggett & Seggett.
ATTORNEYS
N. PETERS, PHOTO-LITHOGRAPHER, WASHINGTON, D. C.

UNITED STATES PATENT OFFICE.

GEORGE DODGE, OF KALAMAZOO, MICHIGAN, ASSIGNOR OF ONE-HALF OF HIS INTEREST TO ETHAN ALLEN, OF SAME PLACE.

IMPROVEMENT IN PLOWS.

Specification forming part of Letters Patent No. 211,892, dated February 4, 1879; Reissue No. 8,926, dated October 14, 1879; application filed August 8, 1879.

*To all whom it may concern:*

Be it known that I, GEORGE DODGE, of Kalamazoo, in the county of Kalamazoo and State of Michigan, have invented a new and useful Improvement in Plows, which is fully described in the following specification, reference being had to the accompanying drawings.

My invention relates to various improvements in plows, the object being to provide a light, strong, durable, and cheap plow with provision for the ready adjustment of the beam and wheel as circumstances require.

Referring to the drawings, Figure 1 is a plan view of the plow. Fig. 2 is a side elevation of the same. Fig. 3 is a longitudinal section of the beam and attachments, taken on the line *x x* of Fig. 1. Fig. 4 is a transverse section, taken on the line *y y* of Fig. 1. Fig. 5 is a detail transverse section, taken on line *z z* of Fig. 1. Fig. 6 is a detail view of the means employed to adjustably connect the plow-handles to the standard. Fig. 7 is a detail view, in side elevation, of the wheel-standard and its manner of connection to its beam-clamping plate. Fig. 8 is a detail view of said plate free from all connecting parts. Fig. 9 is a detail end elevation view of this beam-clamping plate, together with connecting parts.

The particular construction of the standard A and the mold-board B has no connection with the invention, except the upper end of the standard, which is provided with an enlargement or plate, *a*, to provide for the attachment of the beam C. This beam is made of metallic tubing, ordinary gas-pipe of proper size being suitable for this purpose. The beam is straight and of uniform size throughout, and its rear end is provided with a head, *c*, rigidly fastened thereto in any suitable manner, the purpose of which will be presently described.

Two posts or bolts, D, rise from the head of the standard, being shown in this instance as rigidly fastened to the standard; though this is not necessary, as they may be provided with suitable heads, and inserted loosely in holes through the head of the standard, if desired.

Two clamping-plates, E, are provided, having each a central groove, *e*, of such depth that when the plates are put together an opening between them will be formed for the reception of the beam. The plates are also provided with segmental slots $e^1$ in each side, through which the bolts D pass. The rear end of the plow-beam is fitted between these clamping-plates, and nuts *d* turned down upon the upper ends of the bolts D, which are threaded for this purpose. At the rear of the plates E the edges are provided with notches $e^2$, adapted to receive the head *c* on the end of the plow-beam, whereby the latter is prevented from turning. If desired, a small pin, $e^3$, may be arranged in the bottom of the groove in the lower plate, which enters a corresponding hole, *c'*, in the beam, and also prevents displacement of the latter by either longitudinal or rotary movement.

It is evident from this description that the plow-beam may be readily adjusted laterally by slightly loosening the nuts *d*, which will permit the beam to be turned in the direction desired, while the beam is secured between the plates in such a way as to draw the plow forward by the team attached thereto.

The plates E may be cast in one piece, in which case the beam is slipped through the hole made in the fastening device thus formed. The draft attachment may be made to the beam in any suitable manner, being extended, if desired, through the latter, and secured at or near the standard, so that the draft will be directly therefrom.

I prefer, however, an elastic or yielding draft-connection which I have devised especially for this beam. The front end of the beam is threaded, and a screw-cap, F, fitted thereon, which is provided with a suitable slot, *f*. The clevis-piece G is provided with a draft rod or shank, *g*, adapted to enter the slot in the cap F, through which it is permitted to slide back and forth.

Within the tubular beam the draft-rod *g* is surrounded by a spiral spring, G', held in place by a suitable head or stop on the end of the rod. This spring is made sufficiently strong to sustain the ordinary draft on the plow; but when the latter strikes an obstruction the spring yields, and permits the draft-rod to slide forward slightly, thereby taking up the shock and preventing the breakage of any of the parts of the plow.

The cap F may be attached to the end of the beam in any other suitable way, and I do not limit myself to the screw attachment described.

The plow-wheel H is mounted on the bent lower end of a standard, I, which is tubular or not, as desired, and has its lower end, *i*, bent at right angles to the main portion, to form the axle of the wheel. The standard I is attached to the beam by two clamping-plates, K K′, recessed to embrace the beam, to which they are tightly clamped by bolts L passing through them, and provided with nuts *l* on their threaded ends. These bolts have eyes *l′* at their opposite ends, which are adapted to receive the standard I; and the clamping-plate K has lugs or projections *k*, projecting at one side, which are notched to receive the post I.

By turning up the nuts *l* it is evident that the plates K and K′ will be firmly secured to the beam, and at the same time the post I will be clamped in between the projection *k* and the eyes, so as to be held from turning and in any position desired. At the same time, by loosening the nuts slightly the standard may be adjusted vertically to raise or lower the wheel, or may be turned in either direction, so as to bring the wheel into perfect parallelism with the land-side of the plow whenever the lateral adjustment of the beam requires it.

These devices also permit the wheel to run on the land outside of the line of the land-side; or, if desired, the bent end of the beam may be turned around underneath the beam, so that the wheel will run under the latter and in alignment with the land-side. This fastening is also applicable to beams of a different construction by changing the form of the clamping-plates to suit the beam, and in case the latter is wooden, the plate K′ may be dispensed with, and the eyebolts L passed directly through the beam; and with proper flanges on the plate above and below the beam but one bolt will be necessary.

The handles M are also made of gas-pipe or other metal tubing, bent in the desired form, and fitted at their inner ends over pins *a′*, projecting from the standard just in rear of the head or plate *a*. To fasten the handles to the standard, bolts *m* are passed through their lower ends and the pins, and secured by nuts; or, if it is not desired to make the handles detachable, they may be riveted to the pins.

The handles are supported by a skeleton frame, N, provided with apertures *n* at its upper end, through which the handles pass, and at its lower end fastened by a bolt and nut to a bracket, O, provided with a slot, *o*, to permit adjustment of the support, if necessary; though the slot may be dispensed with, as this adjustment will rarely, if ever, be required.

These devices for attaching and supporting the handles permit the latter to be attached and detached with great facility, and their proper adjustment is always accurately secured.

It will, of course, be understood that the head of the standard A, or the clamping-plates between which the beam is held, must be constructed to give the proper pitch to the beam when secured to the standard.

The arrangement of the yielding draft-rod within the beam enables me to attain a direct central draft—an advantage which is gained by my improved pipe-beam.

The use of piping for the handles enables me to make them quickly and cheaply, as it is only necessary to cut the pipe in proper length and give them the required bend, and at the same time they are easily attached to the plow.

Some of the parts described above may, of course, be changed in form, and therefore I do not limit myself to the precise form and construction of the devices herein shown and described, but include in my invention such modifications as will not change the mechanical operation of the several parts shown.

With these improvements I obtain a plow which is cheap and light in construction, but at the same time is strong and durable, while it can be readily taken apart for shipping and repairs.

Having fully described my invention, what I claim as new, and desire to secure by Letters Patent, is—

1. The combination, with a standard and a plow-beam, of two clamping-plates, formed to provide an opening, within which the rear portion of the beam is fitted, together with fastening devices adapted to secure said plates in different positions on the standard, and thereby laterally adjust the plow-beam, substantially as set forth.

2. The combination, with a standard and a plow-beam, of two grooved plates adapted to embrace the rear extremity of the beam, and bolts which work in slots formed in said plates, to secure the latter, together with the beam, in lateral adjustment on the standard, substantially as set forth.

3. The combination, with a standard and a plow-beam, of two plates, respectively provided with a centrally-grooved opening, within which the rear extremity of the beam is fitted, and also having segmental slots on both sides of said opening, together with bolts formed rigid with the standard, which work in said slots, substantially as set forth.

4. The combination, with a plow-beam whose rear end is provided with a laterally-projecting head, of two beam-clamping plates, respectively provided with a notch, in which said head fits to prevent the beam from rotary movement, and fastening devices which secure said plates, together with the beam, to the standard, substantially as set forth.

5. The combination, with a plow-beam whose rear extremity is provided with a hole and two plates, respectively grooved to form an opening, within which the beam fits, of bolts which pass through slots in said plates and secure the latter, together with the beam, in horizontal adjustment on the standard, one of said plates being formed with a pin, which fits in said hole in the beam and prevents displacement of the latter between said clamping-plates, substantially as set forth.

6. The combination, with a standard formed with rear projecting pins, of tubular plow-handles whose forward extremities fit over said pins, and fastening devices which secure said parts together, substantially as set forth.

7. The combination, with a skeleton frame which supports the plow-handles, and whose lower portion projects forward, of a bracket which extends downward and rearward from the standard, together with bolt-and-slot mechanism, which adjustably secures said frame and bracket together, substantially as set forth.

8. The combination, with a plow-beam and a wheel-standard, of a plate formed with a horizontal recess, within which the beam fits, and a beam-fastening device which clamps the standard thereto, said recessed plate fitting about the upper and lower sides of the beam, and thereby maintaining the standard in operative position, substantially as set forth.

9. The combination, with a plow-beam formed tubular throughout its length, and a screw-cap fitted on its threaded forward extremity, of a draft-rod which passes through a slot in said cap, and a spiral spring whose rear end bears against a head formed on the inner end of said rod, while its opposite end bears against said screw-cap, together with a clevis, substantially as set forth.

In testimony that I claim the foregoing I have hereunto set my hand.

GEO. DODGE.

Witnesses:
REUBEN SWEET,
HENRY RIEMERSMA.